(12) United States Patent
Johnson et al.

(10) Patent No.: US 11,674,396 B2
(45) Date of Patent: Jun. 13, 2023

(54) COOLING AIR DELIVERY ASSEMBLY

(71) Applicant: General Electric Company, Schenectady, NY (US)

(72) Inventors: Steven Douglas Johnson, Milford, OH (US); Jonathan Russell Ratzlaff, Loveland, OH (US); Craig Alan Gonyou, Blanchester, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/389,503

(22) Filed: Jul. 30, 2021

(65) Prior Publication Data
US 2023/0036206 A1 Feb. 2, 2023

(51) Int. Cl.
*F01D 5/08* (2006.01)
*F01D 25/12* (2006.01)
*F01D 9/06* (2006.01)
*F02C 7/18* (2006.01)

(52) U.S. Cl.
CPC ............. *F01D 5/085* (2013.01); *F01D 9/065* (2013.01); *F01D 25/12* (2013.01); *F02C 7/185* (2013.01); *F05D 2240/35* (2013.01); *F05D 2260/213* (2013.01); *F05D 2260/2212* (2013.01); *F05D 2260/232* (2013.01); *F05D 2260/607* (2013.01)

(58) Field of Classification Search
CPC .................................. F01D 5/085; F01D 9/065
See application file for complete search history.

(56) References Cited

U.S. PATENT DOCUMENTS

| | | | |
|---|---|---|---|
| 2,569,909 A | 10/1951 | Umney |
| 2,582,842 A | 1/1952 | Messinger |
| 2,632,626 A | 3/1953 | McClintock |
| 3,423,070 A | 1/1969 | Corrigan |
| 3,522,008 A | 7/1970 | Defabaugh et al. |
| 3,603,599 A | 9/1971 | Laird |
| 3,728,039 A | 4/1973 | Plemmons et al. |
| 3,779,007 A | 12/1973 | Lavash |
| 3,814,313 A | 6/1974 | Beam et al. |

(Continued)

FOREIGN PATENT DOCUMENTS

| | | |
|---|---|---|
| CN | 1603596 A | 4/2005 |
| CN | 101576024 A | 11/2009 |

(Continued)

*Primary Examiner* — Todd E Manahan
*Assistant Examiner* — David P. Olynick
(74) *Attorney, Agent, or Firm* — Dority & Manning, P.A.

(57) ABSTRACT

A gas turbine engine includes a combustion section, a turbine section, and a compressor section. The combustion section includes a combustor casing, a combustor, a cooling duct, and an outer duct. The combustor casing defines at least in part a diffuser cavity and a fluid inlet. The combustor disposed is in the diffuser cavity. The cooling duct is in fluid communication with the fluid inlet in the combustor casing and is configured to transport a flow of cooled air. The outer duct surrounds at least a portion of the cooling duct and extends along a portion of an entire length of the cooling duct. The outer duct defines a gap with the cooling duct and is configured to transport a flow of buffer air. The turbine section is disposed downstream from the combustion section. The cooling duct is in fluid communication with the turbine section.

16 Claims, 5 Drawing Sheets

(56) References Cited

U.S. PATENT DOCUMENTS

| | | |
|---|---|---|
| 3,895,243 A | 7/1975 | Amend et al. |
| 3,918,835 A | 11/1975 | Yamarik et al. |
| 4,023,731 A | 5/1977 | Patterson |
| 4,101,242 A | 7/1978 | Coplin et al. |
| 4,138,856 A | 2/1979 | Orlowski |
| 4,199,975 A | 4/1980 | Schrock et al. |
| 4,254,618 A | 3/1981 | Elovic |
| 4,466,239 A | 8/1984 | Napoli et al. |
| 4,466,481 A | 8/1984 | Wilson et al. |
| 4,505,124 A | 3/1985 | Mayer |
| 4,527,386 A | 7/1985 | Markowski |
| 4,534,698 A | 8/1985 | Tomich |
| 4,546,605 A | 10/1985 | Mortimer et al. |
| 4,550,573 A | 11/1985 | Rannenberg |
| 4,613,280 A | 9/1986 | Tate |
| 4,639,388 A | 1/1987 | Ainsworth et al. |
| 4,688,627 A | 8/1987 | Jean-Luc et al. |
| 4,730,982 A | 3/1988 | Kervistin |
| 4,773,212 A | 9/1988 | Griffin et al. |
| 4,805,398 A | 2/1989 | Jourdain et al. |
| 4,808,073 A | 2/1989 | Zaehring et al. |
| 4,832,999 A | 5/1989 | Sweet |
| 4,867,639 A | 9/1989 | Strangman |
| 4,920,741 A | 5/1990 | Liebl |
| 5,080,557 A | 1/1992 | Berger |
| 5,127,794 A | 7/1992 | Burge et al. |
| 5,149,018 A | 9/1992 | Clark |
| 5,174,714 A | 12/1992 | Plemmons et al. |
| 5,195,868 A | 3/1993 | Plemmons et al. |
| 5,232,672 A | 8/1993 | Spadaccini et al. |
| 5,236,302 A | 8/1993 | Weisgerber et al. |
| 5,277,959 A | 1/1994 | Kourtides et al. |
| 5,297,386 A | 3/1994 | Kervistin |
| 5,305,616 A | 4/1994 | Coffinberry |
| 5,316,437 A | 5/1994 | Czachor |
| 5,341,636 A | 8/1994 | Paul |
| 5,562,408 A | 10/1996 | Proctor et al. |
| 5,667,168 A | 9/1997 | Fluegel |
| 5,685,158 A | 11/1997 | Lenahan et al. |
| 5,722,241 A | 3/1998 | Huber |
| 5,724,806 A | 3/1998 | Homer |
| 5,834,632 A | 11/1998 | Olender et al. |
| 6,106,229 A | 8/2000 | Nikkanen et al. |
| 6,116,852 A | 9/2000 | Pierre et al. |
| 6,123,170 A | 9/2000 | Porte |
| 6,182,435 B1 | 2/2001 | Niggemann et al. |
| 6,250,097 B1 | 6/2001 | Lui et al. |
| 6,251,494 B1 | 6/2001 | Schreiber |
| 6,253,554 B1 | 7/2001 | Kobayashi et al. |
| 6,308,511 B1 | 10/2001 | Beeck et al. |
| 6,361,277 B1 | 3/2002 | Bulman et al. |
| 6,382,903 B1 | 5/2002 | Camso et al. |
| 6,415,595 B1 | 7/2002 | Wilmot, Jr. et al. |
| 6,435,454 B1 | 8/2002 | Engelhardt |
| 6,485,255 B1 | 11/2002 | Care et al. |
| 6,540,477 B2 | 4/2003 | Glynn et al. |
| 6,575,699 B1 | 6/2003 | Jones |
| 6,672,072 B1 | 1/2004 | Giffin, III |
| 6,701,717 B2 | 3/2004 | Flatman et al. |
| 7,017,349 B2 | 3/2006 | Laurello et al. |
| 7,147,429 B2 | 12/2006 | Czachor et al. |
| 7,260,926 B2 | 8/2007 | Sabatino et al. |
| 7,296,415 B2 | 11/2007 | Coulon et al. |
| 7,377,098 B2 | 5/2008 | Walker et al. |
| 7,395,657 B2 | 7/2008 | Johnson |
| 7,398,641 B2 | 7/2008 | Stretton et al. |
| 7,604,095 B2 | 10/2009 | Mitchell |
| 7,716,913 B2 | 5/2010 | Rolt |
| 7,766,609 B1 | 8/2010 | Liang |
| 7,836,680 B2 | 11/2010 | Schwarz et al. |
| 7,882,704 B2 | 2/2011 | Chen |
| 7,886,580 B2 | 2/2011 | Kumar et al. |
| 7,966,807 B2 | 6/2011 | Norris et al. |
| 7,987,676 B2 | 8/2011 | Ast et al. |
| 7,993,102 B2 | 8/2011 | Desai et al. |
| 7,998,250 B2 | 8/2011 | Pondelick et al. |
| 8,177,884 B2 | 5/2012 | Schmidt et al. |
| 8,256,229 B2 | 9/2012 | Glahn et al. |
| 8,261,528 B2 | 9/2012 | Chillar et al. |
| 8,261,593 B1 | 9/2012 | Sanders |
| 8,277,170 B2 | 10/2012 | Hess et al. |
| 8,291,748 B2 | 10/2012 | Kumar et al. |
| 8,348,608 B2 | 1/2013 | Willett et al. |
| 8,459,040 B2 | 6/2013 | Glahn et al. |
| 8,499,822 B2 | 8/2013 | Bulin et al. |
| 8,522,572 B2 | 9/2013 | Coffinberry et al. |
| 8,561,386 B2 | 10/2013 | Mons |
| 8,578,720 B2 | 11/2013 | Ebert et al. |
| 8,591,102 B2 | 11/2013 | Frach et al. |
| 8,678,753 B2 | 3/2014 | Farrell |
| 8,684,275 B2 | 4/2014 | Vafai et al. |
| 8,747,055 B2 | 6/2014 | McCune et al. |
| 8,757,508 B2 | 6/2014 | Haasz et al. |
| 8,765,070 B2 | 7/2014 | Norton et al. |
| 8,776,866 B2 | 7/2014 | Cederberg et al. |
| 8,789,377 B1 | 7/2014 | Brostmeyer |
| 8,800,290 B2 | 8/2014 | Burd et al. |
| 8,858,161 B1 | 10/2014 | Ryznic et al. |
| 8,932,007 B2 | 1/2015 | Khanin et al. |
| 8,944,367 B2 | 2/2015 | Bystry, Jr. et al. |
| 8,973,371 B2 | 3/2015 | King et al. |
| 8,978,353 B2 | 3/2015 | Norton et al. |
| 8,979,470 B2 | 3/2015 | Riazantsev et al. |
| 8,979,482 B2 | 3/2015 | Khanin et al. |
| 8,984,884 B2 | 3/2015 | Xu et al. |
| 9,014,791 B2 | 4/2015 | Held |
| 9,036,352 B2 | 5/2015 | Engelhardt et al. |
| 9,038,397 B2 | 5/2015 | Papa et al. |
| 9,074,605 B2 | 7/2015 | Bouru et al. |
| 9,091,172 B2 | 7/2015 | Wolfgram et al. |
| 9,091,173 B2 | 7/2015 | Mosley et al. |
| 9,120,580 B2 | 9/2015 | Sampath |
| 9,127,566 B2 | 9/2015 | Suciu et al. |
| 9,188,009 B2 | 9/2015 | Yilmaz et al. |
| 9,169,045 B2 | 10/2015 | Clark |
| 9,181,933 B2 | 11/2015 | Daly et al. |
| 9,188,010 B2 | 11/2015 | Jha et al. |
| 9,200,855 B2 | 12/2015 | Kington et al. |
| 9,234,463 B2 | 1/2016 | Benjamin et al. |
| 9,267,382 B2 | 2/2016 | Szwedowicz et al. |
| 9,267,513 B2 | 2/2016 | Giametta |
| 9,297,310 B2 | 3/2016 | Giri et al. |
| 9,328,978 B2 | 5/2016 | Appukuttan et al. |
| 9,347,334 B2 | 5/2016 | Joe et al. |
| 9,410,482 B2 | 8/2016 | Krautheim et al. |
| 9,422,063 B2 | 8/2016 | Diaz |
| 9,435,224 B2 | 9/2016 | Raison et al. |
| 9,458,764 B2 | 10/2016 | Alecu et al. |
| 9,474,186 B2 | 10/2016 | Campbell et al. |
| 9,476,313 B2 | 10/2016 | Caprario et al. |
| 9,534,537 B2 | 1/2017 | Gagne et al. |
| 9,567,095 B2 | 2/2017 | McCarthy et al. |
| 9,580,185 B2 | 2/2017 | Rhoden et al. |
| 9,593,590 B2 | 3/2017 | Ebert et al. |
| 9,624,831 B2 | 4/2017 | Brousseau et al. |
| 9,644,490 B2 | 5/2017 | Joe et al. |
| 9,670,780 B2 | 6/2017 | Baxley |
| 9,719,425 B2 | 8/2017 | Roush |
| 9,739,546 B2 | 8/2017 | Bertilsson et al. |
| 9,829,259 B2 | 11/2017 | Nyander et al. |
| 9,926,942 B2 * | 3/2018 | Duong .................. F02C 3/08 |
| 9,995,314 B2 | 6/2018 | Miller et al. |
| 10,036,256 B2 | 7/2018 | Kowalski et al. |
| 10,233,840 B2 | 3/2019 | Hiester |
| 10,253,632 B2 | 4/2019 | Lyons |
| 10,253,976 B2 | 4/2019 | Gunderson |
| 10,352,243 B2 | 7/2019 | Mizukami et al. |
| 10,393,021 B2 | 8/2019 | Smith, III et al. |
| 10,415,474 B2 | 9/2019 | Riaz et al. |
| 10,627,167 B2 | 4/2020 | Sampath et al. |
| 10,746,098 B2 | 8/2020 | Turner et al. |
| 10,830,138 B2 | 11/2020 | Manteiga et al. |
| 10,948,108 B2 * | 3/2021 | Yang .................. F02C 7/185 |
| 2002/0036115 A1 | 3/2002 | Wilson |

(56) References Cited

U.S. PATENT DOCUMENTS

| | | |
|---|---|---|
| 2003/0156940 A1 | 8/2003 | Czachor |
| 2004/0047726 A1 | 3/2004 | Morrison |
| 2004/0163888 A1 | 8/2004 | Johnson |
| 2007/0122269 A1 | 5/2007 | Meier et al. |
| 2008/0019829 A1 | 1/2008 | Argaud et al. |
| 2008/0258404 A1 | 10/2008 | Pillhoefer |
| 2008/0260522 A1 | 10/2008 | Alvanos |
| 2009/0133380 A1 | 5/2009 | Donnerhack |
| 2009/0188234 A1 | 7/2009 | Suciu et al. |
| 2009/0229812 A1 | 9/2009 | Pineo et al. |
| 2009/0277153 A1 | 11/2009 | Harper et al. |
| 2010/0139288 A1 | 6/2010 | Rago |
| 2010/0157525 A1 | 6/2010 | Ullman et al. |
| 2010/0192593 A1 | 8/2010 | Brown et al. |
| 2010/0212857 A1 | 8/2010 | Bulin et al. |
| 2010/0263375 A1 | 10/2010 | Grieve |
| 2010/0313591 A1 | 12/2010 | Lents et al. |
| 2011/0150634 A1 | 6/2011 | Bajusz et al. |
| 2011/0162387 A1 | 7/2011 | Chir et al. |
| 2011/0206502 A1* | 8/2011 | Rulli .............. F01D 11/24 415/177 |
| 2012/0111095 A1 | 5/2012 | Sheehan |
| 2012/0216502 A1 | 8/2012 | Freund et al. |
| 2013/0104564 A1 | 5/2013 | Arar |
| 2013/0129494 A1 | 5/2013 | Duchaine et al. |
| 2013/0186100 A1 | 7/2013 | Rhoden et al. |
| 2013/0192238 A1 | 8/2013 | Munsell et al. |
| 2013/0247587 A1 | 9/2013 | Lo |
| 2013/0259687 A1 | 10/2013 | Suciu et al. |
| 2013/0280028 A1 | 10/2013 | Benjamin et al. |
| 2013/0280040 A1 | 10/2013 | Johns et al. |
| 2014/0165570 A1 | 6/2014 | Herring |
| 2014/0205446 A1 | 7/2014 | Patsouris et al. |
| 2014/0230444 A1 | 8/2014 | Hao et al. |
| 2014/0248122 A1 | 9/2014 | Vetters et al. |
| 2014/0290272 A1 | 10/2014 | Mulcaire |
| 2014/0345292 A1 | 11/2014 | Diaz et al. |
| 2014/0360153 A1 | 12/2014 | Papa et al. |
| 2015/0000291 A1 | 1/2015 | Smith et al. |
| 2015/0040986 A1 | 2/2015 | Tichborne et al. |
| 2015/0114611 A1 | 4/2015 | Morris et al. |
| 2015/0159555 A1 | 6/2015 | Heinrich et al. |
| 2015/0308341 A1 | 10/2015 | Hiester |
| 2016/0010476 A1 | 1/2016 | Grover |
| 2016/0076379 A1 | 3/2016 | Forcier et al. |
| 2016/0076381 A1 | 3/2016 | Suciu et al. |
| 2016/0090914 A1 | 3/2016 | Lyons |
| 2016/0091262 A1 | 3/2016 | Chainer et al. |
| 2016/0108814 A1 | 4/2016 | Schmitz |
| 2016/0138478 A1 | 5/2016 | Negulescu |
| 2016/0146016 A1 | 5/2016 | Johns et al. |
| 2016/0186571 A1 | 6/2016 | Suciu et al. |
| 2016/0215646 A1 | 7/2016 | Gonyou et al. |
| 2016/0222982 A1 | 8/2016 | Powell et al. |
| 2016/0290174 A1 | 10/2016 | Ekanayake et al. |
| 2016/0290214 A1 | 10/2016 | Ekanayake et al. |
| 2016/0290230 A1 | 10/2016 | Ekanayake et al. |
| 2016/0290231 A1 | 10/2016 | Ekanayake et al. |
| 2016/0312615 A1 | 10/2016 | Lyons |
| 2016/0326963 A1 | 11/2016 | Yamazaki |
| 2016/0333700 A1 | 11/2016 | Taheny |
| 2016/0341126 A1 | 11/2016 | Kupratis et al. |
| 2016/0369700 A1 | 12/2016 | Ribarov et al. |
| 2017/0002834 A1 | 1/2017 | Powell et al. |
| 2017/0009663 A1 | 1/2017 | Epstein |
| 2017/0030196 A1 | 2/2017 | Pirker et al. |
| 2017/0030266 A1 | 2/2017 | Cerny et al. |
| 2017/0044984 A1 | 2/2017 | Pesyna et al. |
| 2017/0074166 A1 | 3/2017 | Gagne et al. |
| 2017/0114721 A1 | 4/2017 | Miller et al. |
| 2017/0159566 A1 | 6/2017 | Sennoun et al. |
| 2017/0167271 A1 | 6/2017 | McCaffrey |
| 2017/0167382 A1 | 6/2017 | Miller et al. |
| 2017/0176014 A1* | 6/2017 | Hughes .................. F02C 3/04 |
| 2017/0184027 A1 | 6/2017 | Moniz et al. |
| 2017/0211586 A1 | 7/2017 | Gage et al. |
| 2017/0211590 A1 | 7/2017 | Moniz et al. |
| 2017/0248333 A1 | 8/2017 | Varley et al. |
| 2017/0260905 A1 | 9/2017 | Schmitz |
| 2017/0292532 A1 | 10/2017 | Wall |
| 2017/0311478 A1 | 10/2017 | Engelhardt et al. |
| 2018/0266688 A1 | 9/2018 | Pearson |
| 2018/0328177 A1 | 11/2018 | Turner et al. |
| 2018/0354637 A1 | 12/2018 | Suciu et al. |
| 2018/0354638 A1 | 12/2018 | Ferrier et al. |
| 2019/0063313 A1 | 2/2019 | Rez et al. |
| 2019/0078516 A1 | 3/2019 | Sampath et al. |
| 2019/0153952 A1 | 5/2019 | Niergarth et al. |
| 2019/0153953 A1 | 5/2019 | Niergarth et al. |
| 2019/0203600 A1 | 7/2019 | Petrasko et al. |
| 2019/0218971 A1 | 7/2019 | Niergarth et al. |
| 2019/0383564 A1 | 12/2019 | Miller et al. |
| 2020/0240720 A1 | 7/2020 | Sampath et al. |
| 2021/0054753 A1* | 2/2021 | Prenter .................. F01D 5/081 |

FOREIGN PATENT DOCUMENTS

| | | |
|---|---|---|
| CN | 103128972 A | 6/2013 |
| CN | 103375200 A | 10/2013 |
| CN | 203441604 U | 2/2014 |
| CN | 105579688 A | 5/2016 |
| CN | 107035528 A | 8/2017 |
| DE | 10347335 A1 | 5/2005 |
| DE | 102005041830 A1 | 3/2007 |
| EP | 0565442 A1 | 10/1993 |
| EP | 1336739 A2 | 8/2003 |
| EP | 1813781 A1 | 8/2007 |
| EP | 2003311 A2 | 12/2008 |
| EP | 2009141 A2 | 12/2008 |
| EP | 2196632 A2 | 6/2010 |
| EP | 3018304 A1 | 5/2016 |
| EP | 3075957 A1 | 10/2016 |
| EP | 3130763 A1 | 2/2017 |
| EP | 3514349 A1 | 7/2019 |
| FR | 2881794 A1 | 8/2006 |
| GB | 2034822 A | 6/1980 |
| GB | 2075123 A | 11/1981 |
| GB | 2136880 A | 9/1984 |
| GB | 2204361 A | 11/1988 |
| GB | 2299378 A | 10/1996 |
| GB | 2426287 A | 11/2006 |
| JP | S5425989 A | 2/1979 |
| JP | S54144488 A | 11/1979 |
| JP | S5932893 U | 2/1984 |
| JP | H07208200 A | 8/1995 |
| JP | H1035266 A | 2/1998 |
| JP | 2000257402 A | 9/2000 |
| JP | 2001123803 A | 5/2001 |
| JP | 2001234707 A | 8/2001 |
| JP | 2002004806 A | 1/2002 |
| JP | 2002174458 A | 6/2002 |
| JP | 2005201275 A | 7/2005 |
| JP | 2007516111 A | 6/2007 |
| JP | 2012512745 A | 6/2012 |
| JP | 2012519803 A | 8/2012 |
| WO | WO02/16743 A1 | 2/2002 |
| WO | WO02/038938 A1 | 5/2002 |
| WO | WO2006/079438 A1 | 8/2006 |
| WO | WO2011/038188 A1 | 3/2011 |
| WO | WO2015/105552 A1 | 7/2015 |

* cited by examiner

COOLING AIR DELIVERY ASSEMBLY

FIELD

The present disclosure generally relates to cooling air delivery system of a gas turbine engine.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly.

In gas turbine engines, thermal management systems are incorporated to cool certain components and prevent damage due to overheating. In existing thermal management systems, air ducts passing through a combustion chamber of the gas turbine engine may be provided to provide a flow of cooling air to a turbine section of the gas turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
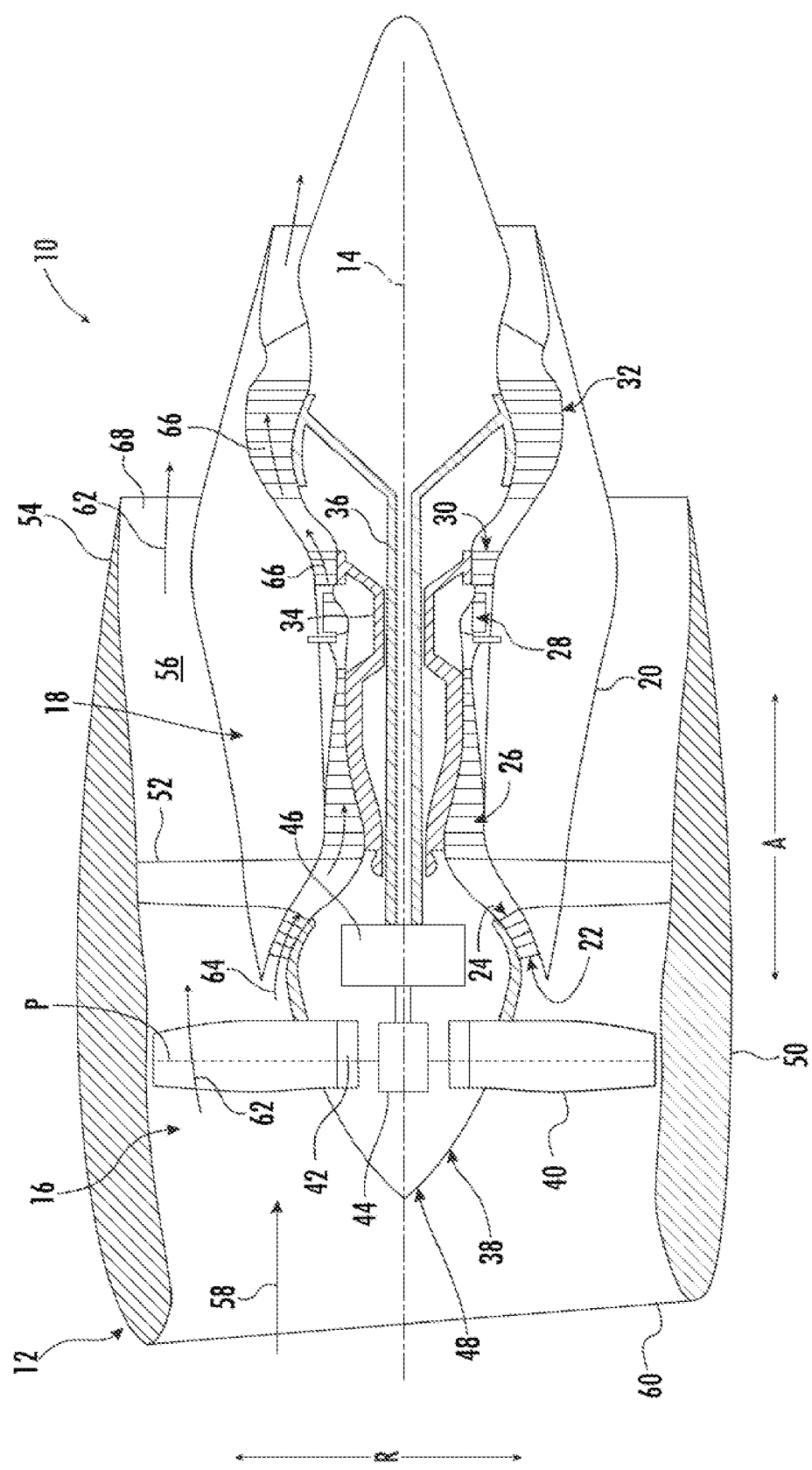
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The present disclosure is generally related to a thermal management system for a gas turbine engine with a compressor section, a combustion section, and a turbine section. Air ducts passing through a combustion chamber of a gas turbine engine may provide a flow of cooling air to a turbine section of the gas turbine engine. Such air ducts may be susceptible to thermal pollution within the chamber. This thermal pollution of the cooling air can lead to an increase in thermal energy of the cooling air thereby reducing the cooling effectiveness of the cooling air when the cooling air reaches its eventual target for thermal energy transfer. Accordingly, the inventors of the present disclosure have found that improvements to these air ducts would be beneficial.

The disclosure presents a nested tube configuration, forming a double wall, for running a layer of buffer air around a cooled cooling air delivery duct. The buffer air sent through a boundary layer defined between the double wall reduces an amount of heat pollution of the cooled cooling air through the cooled cooling air delivery duct. The buffer air can then be delivered for thermal management to other cavities or components of the engine such as a high pressure compressor aft cavity or a component or cavity of a high pressure turbine of the engine.

As described herein, the disclosed systems present an insulated delivery circuit for flow of cooled air that reduces an amount of thermal pollution caused by the high levels of thermal energy present in a combustion section. The reduction in thermal pollution to the flow of cooled air may enable a reduction in a flow rate of flow of cooled air needed for cooling and thereby enabling a reduced size of the source of flow of cooled air (e.g., a cooled cooling air heat exchanger, another heat exchanger, or another thermal management device). Additionally, or alternatively, the reduction in thermal pollution to the flow of cooled air may enable increased cooling of the end component(s) receiving such flow of cooled air.

Additionally, in at least certain exemplary aspects, the flow of buffer air can also be utilized by the high pressure compressor via an aft cavity. The flow of buffer air can be used to reduce a temperature of the air inside the aft cavity resulting in cooler air being delivered to the high pressure compressor for cooling purposes. As a result of this cooler cooling air being delivered to the high pressure compressor by way of the aft cavity, a dedicated stream of cooling air from a heat exchanger (that otherwise would have been needed) may be eliminated due to cooling benefits gained by the utilization of the flow of buffer air as cooling air for the high pressure compressor. In this way, the disclosed systems may enable improved rotor temperatures of the high pressure compressor as well as of a high pressure turbine of the engine, improved cooling efficiency, improved combustion efficiency, or a combination thereof.

Referring now to the drawings, wherein identical numerals indicate the same elements throughout the figures, FIG. 1 is a schematic, cross-sectional view of a propulsion system 10 in accordance with an exemplary embodiment of the present disclosure. More particularly, for the embodiment of FIG. 1, propulsion system 10 includes a gas turbine engine, referred to herein as "turbofan engine 12." In one example, turbofan engine 12 can be a high-bypass turbofan jet engine. As shown in FIG. 1, turbofan engine 12 defines an axial direction A (extending parallel to longitudinal centerline 14 provided for reference) and a radial direction R. In general, turbofan engine 12 includes a fan section 16 and a turbomachine 18 disposed downstream from fan section 16.

The exemplary turbomachine 18 depicted generally includes a substantially tubular outer casing 20 that defines an annular inlet 22. Outer casing 20 encases, in serial flow order/relationship, a compressor section including a booster or low pressure compressor 24 ("LP compressor 24") and a high pressure compressor 26 ("HP compressor 26"); a combustion section 28; a turbine section including a high pressure turbine 30 (HP turbine 30") and a low pressure turbine 32 ("LP turbine 32"); and a combustion section 28. A high pressure shaft or spool 34 ("HP spool 34") drivingly connects HP turbine 30 to HP compressor 26. A low pressure shaft or spool 36 ("LP spool 36") drivingly connects LP turbine 32 to LP compressor 24.

For the embodiment depicted, fan section 16 includes a variable pitch fan 38 having a plurality of fan blades 40 coupled to a disk 42 in a spaced apart manner. As depicted, fan blades 40 extend outwardly from disk 42 generally along radial direction R. Each fan blade 40 is rotatable relative to disk 42 about a pitch axis P by virtue of fan blades 40 being operatively coupled to a suitable actuation member 44 configured to collectively vary the pitch of fan blades 40, e.g., in unison. Fan blades 40, disk 42, and actuation member 44 are together rotatable about longitudinal centerline 14 by LP spool 36 across a power gear box 46. Power gear box 46 includes a plurality of gears for stepping down the rotational speed of LP spool 36 to a more efficient rotational fan speed.

Referring still to the exemplary embodiment of FIG. 1, disk 42 is covered by a rotatable front hub 48 aerodynamically contoured to promote an airflow through the plurality of fan blades 40. Additionally, fan section 16 includes an annular fan casing or outer nacelle 50 that circumferentially surrounds variable pitch fan 38 and/or at least a portion of turbomachine 18. It should be appreciated that in some embodiments, nacelle 50 is configured to be supported relative to turbomachine 18 by a plurality of circumferentially spaced outlet guide vanes 52. Moreover, a downstream section 54 of nacelle 50 extends over an outer portion of turbomachine 18 so as to define a bypass airflow passage 56 therebetween.

During operation of turbofan engine 12, a volume of air 58 enters turbofan engine 12 through an associated inlet 60 of nacelle 50 and/or fan section 16. As the volume of air 58 passes across fan blades 40, a first portion of air 58 as indicated by arrows 62 is directed or routed into bypass airflow passage 56 and a second portion of air 58 as indicated by arrow 64 is directed or routed into LP compressor 24. The ratio between first portion of air 62 and second portion of air 64 is commonly known as a bypass ratio. The pressure of second portion of air 64 is then increased as it is routed through high pressure (HP) compressor 26 and into combustion section 28, where it is mixed with fuel and burned to provide combustion gases 66. Subsequently, combustion gases 66 are routed through HP turbine 30 and LP turbine 32, where a portion of thermal and/or kinetic energy from combustion gases 66 is extracted.

Combustion gases 66 are then routed through combustion section 28 of turbomachine 18 to provide propulsive thrust. Simultaneously, the pressure of first portion of air 62 is substantially increased as first portion of air 62 is routed through bypass airflow passage 56 before it is exhausted from fan nozzle exhaust section 68 of turbofan engine 12, also providing propulsive thrust.

It should be appreciated, however, that turbofan engine 12 depicted in FIG. 1 is by way of example only, and that in other exemplary embodiments, aspects of the present disclosure may additionally, or alternatively, be applied to any other suitable gas turbine engine. For example, in other exemplary embodiments, turbofan engine 12 may instead be any other suitable aeronautical gas turbine engine, such as a turbojet engine, turboshaft engine, turboprop engine, etc. Additionally, in still other exemplary embodiments, turbofan engine 12 may include or be operably connected to any other suitable accessory systems.

Figure 2:
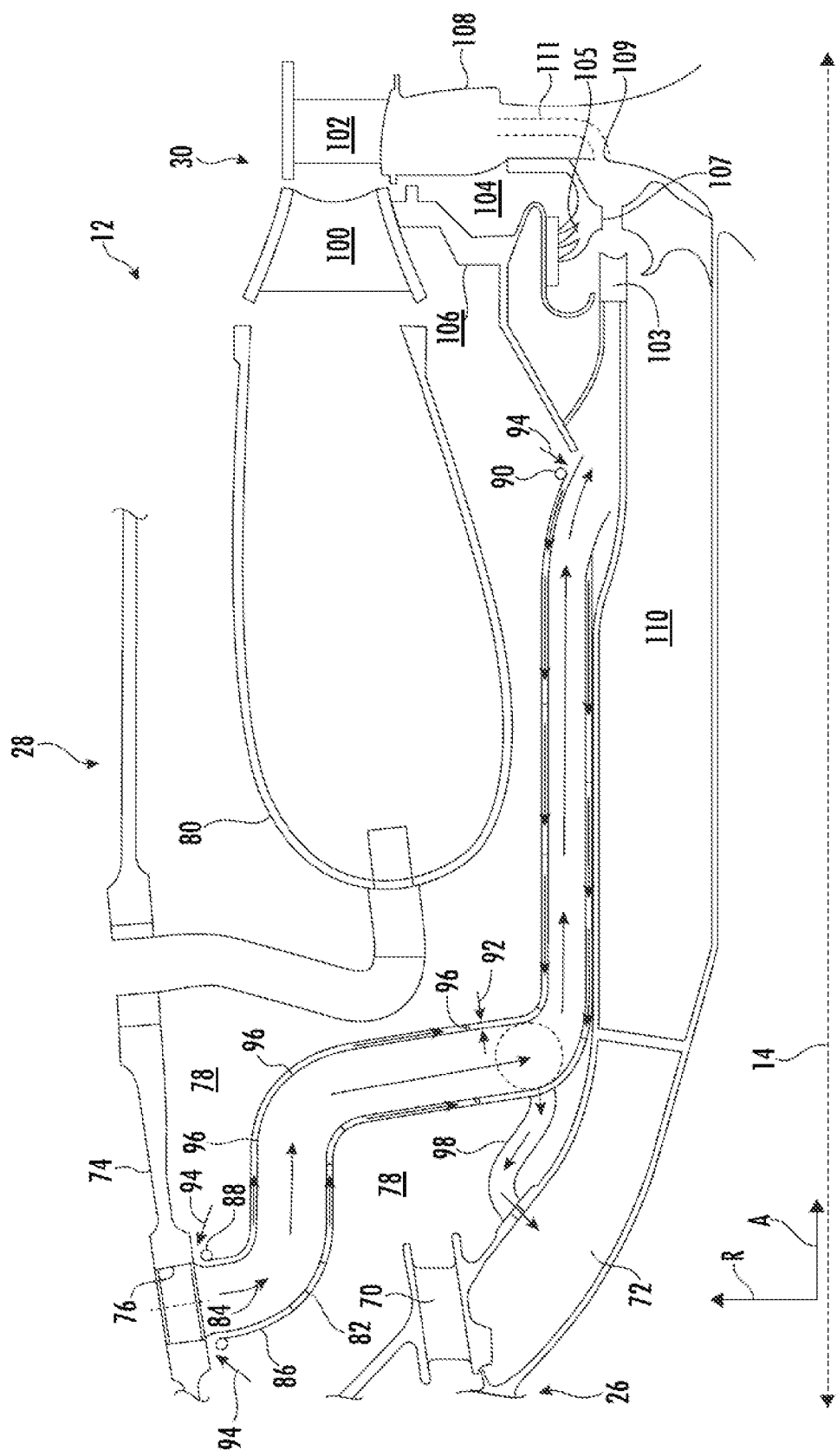
FIG. 2 is a cross-sectional view of a compressor section and a combustion section of the exemplary gas turbine that shows a first cooling tube assembly in accordance with an exemplary aspect of the present disclosure.

Referring now to FIG. 2, FIG. 2 is a cross-sectional view of a portion of turbomachine 18 and shows HP compressor 26, combustion section 28, and HP turbine 30.

As shown in FIG. 2, HP compressor 26 includes a diffuser nozzle 70 and defines an aft cavity 72. Diffuser nozzle 70 is disposed at an eft end of HP compressor 26 and straightens or re-directs a flow of air flowing from HP compressor 26 to combustion section 28. Aft cavity 72 is also disposed at an aft end of HP compressor and stores and supplies, e.g., cooling air for use by HP compressor 26. As will be discussed herein, the air within aft cavity 72 can be used to provide a thermal energy transfer benefit to HP compressor 26.

Combustion section 28 includes a combustor casing 74 and a combustor 80. The combustor casing 74 of combustion section 28 defines a fluid inlet 76 and at least in part a chamber configured to house the combustor 80, referred to herein as a diffuser cavity 78. Fluid inlet 76 extends through a portion of combustor casing 74. The gas turbine engine 10 further includes a cooling duct assembly including a cooling duct 82. The fluid inlet 76 is configured to communicate a flow 84 of cooled air through combustor casing 74 into a cooling duct 82.

In addition to the cooling duct 82, the cooling duct assembly also includes an outer duct 86. Cooling duct 82 and outer duct 86 are pipes or conduits. In this example, cooling duct 82 and outer duct 86 include generally circular cross-section shapes. A diameter of cooling duct 82 and a diameter of outer duct 86 are, for the embodiment shown, approximately constant along the lengths of cooling duct 82 and outer duct 86.

Cooling duct 82 is connected to a portion of combustor casing 74 and is in fluid communication with fluid inlet 76 in combustor casing 74. Cooling duct 82 extends from fluid inlet 76, through a portion of diffuser cavity 78, passes between HP compressor 26 and combustor 80. For example, a portion of cooling duct 82 is disposed inward along radial direction R from combustor 80 and extends in axial direction A. Cooling duct 82 is configured to transport flow 84 of cooled air from fluid inlet 76, through diffuser cavity 78, and to a destination. In certain exemplary embodiments, cooling duct 82 can deliver flow 84 of cooled air to a portion of or to components relating to HP turbine 30.

In this example, flow 84 of cooled air is a flow of cooled cooling air from a cooled cooling air heat exchanger (see, e.g., the embodiment of FIG. 5, described below). It will be appreciated, however, that in other exemplary embodiments, flow 84 of cooled air can come from other sources of cooling air such as an ambient source, a bleed air source, a thermal management system of propulsion system 10, or other air sources.

Outer duct 86 surrounds at least a portion of cooling duct 82 and extends along a portion of an entire length of cooling duct 82. The term "entire length" with respect to the cooling duct 82 refers to a length of cooling duct 82 from a location where cooling duct 82 connects to combustor casing 74 at inlet 76 to a terminal endpoint of the other end of cooling duct 82 that is opposite from the end of cooling duct at inlet 76.

In this example, a first end 88 of outer duct 86 is disposed adjacent to a portion of combustor casing 74 that surrounds fluid inlet 76. As used herein, the term adjacent indicates next to or adjoining without any intervening objects or portions positioned therebetween. A second end 90 of outer duct 86 is disposed on an opposite end of outer duct 86 as from first end 88. More specifically, in at least certain exemplary aspects, second end 90 of outer duct 86 is disposed inward along radial direction R of turbofan engine and aft of first end 88 of outer duct 86 (with a forward direction to the left and an aft direction to the right as shown in FIG. 2).

A gap 92 is formed between and defined by cooling duct 82 and outer duct 86. Outer duct 86 is configured to receive flow 94 of buffer air from the diffuser cavity 78. As shown in FIG. 2, outer duct 86 receives a flow 94 of buffer air into gap 92 at both of first end 88 and second end 90 of outer duct 86. After flow 94 of buffer air flows into gap 92, flow 94 of buffer air is drawn through gap 92 towards a supply line 98.

Within gap 92 is a plurality of standoffs 96. Standoffs 96 are small pieces of rigid or semi-rigid material that brace or support outer duct 86 relative to cooling duct 82, extending between outer duct 86 and cooling duct 82. For example, standoffs 96 can include a minimal cross sectional area in a direction of flow through gap 92.

As shown in FIG. 2, outer duct 86 and cooling duct 82 form a nested tube configuration with cooling duct 82 nested inside of outer duct 86. In particular, cooling duct 82 is nested within outer duct 86. More specifically, in at least certain exemplary aspects, cooling duct 82 is disposed inside of outer duct 86. In this particular example, cooling duct 82 includes portions that extend past or beyond first end 88 and second end 90 of outer duct 86. In other examples, outer duct 86 extends along a majority of cooling duct 82 (such as greater than or equal to 50% of the entire length of cooling duct 82, such as greater than or equal to 75% of the entire length of cooling duct 82, such as greater than or equal to 85% the entire length of cooling duct 82, such as greater than or equal to 95% the entire length of cooling duct 82).

Cooling duct 82 and outer duct 86 are generally disposed coaxially relative to each other. It will be appreciated, however, that in certain exemplary embodiments, that at certain points along the lengths of cooling duct 82 and outer duct 86, axial centerlines of cooling duct 82 and outer duct 86 may be offset slightly due to curves of either duct or due to gravity.

The nested configuration of cooling duct 82 and outer duct 86 forms a double-wall structure through which flow 94 of buffer air can flow. Here, gap 92 forms a boundary layer flowing through the double wall configuration of cooling duct 82 and outer duct 86. Flow 94 of buffer air sent through gap 92 (e.g., the boundary layer) creates a layer of separation between air disposed in diffuser cavity 78 and flow 84 of cooled air flowing through cooling duct 82. In this way, flow 94 of buffer air absorbs thermal energy from air disposed in diffuser cavity 78 thereby reducing an amount of thermal energy transferred into flow 84 of cooled air.

Supply line 98 extends between and fluidly connects outer duct 86 to aft cavity 72 of HP compressor 26. In certain exemplary embodiments, flow 94 of buffer air is drawn from gap 92, into supply line 98, and is delivered to aft cavity 72. In this way, a portion of flow 94 of buffer is diverted to aft cavity 72 of HP compressor 26 of propulsion system 10. After being delivered to aft cavity 72, flow 94 of buffer air can be utilized by HP compressor 26 for thermal energy transfer benefits. More specifically, in at least certain exemplary aspects, the portion of flow 94 of buffer air diverted into aft cavity 72 can be used to decrease a thermal energy of aft cavity 72 (and of the air within aft cavity 72) of HP compressor 26 of propulsion system 10.

In this example, HP turbine 30 includes an inlet guide vane 100 ("IGV 100") and a first stage blade 102. In FIG. 2, a single IGV 100 and a single first stage blade 102 are shown. However, it will be appreciated that propulsion system 10 includes a plurality of IGV's 100 and a plurality of first stage blades 102 extending around a circumferential direction of longitudinal centerline 14. IGV 100 is a stationary airfoil for guiding or redirecting a flow of fluid passing across IGV 100. Here, IGV 100 straightens a or changes a direction of a flow of combustion gasses passing from combustion section 28 to HP turbine 30. First stage blade 102 is an airfoil configured to rotate (e.g., with a rotor disk 108) about longitudinal centerline 14. For example, as combustion gasses are expelled from combustor 80, the combustion gasses push against first stage blade 102 cause first stage blade 102 to rotate about longitudinal centerline 14.

In between IGV 100 and first stage turbine blades 102 a forward wheelspace cavity 104 is formed. More specifically, in at least certain exemplary aspects, forward wheelspace cavity 104 is defined and formed by components corresponding to IGV 100 and first stage turbine blades 102, such as a frame 106 supporting IGV 100 and rotor disk 108 to which first stage rotor blade is attached.

Further, the engine 10 includes an assembly for providing flow 84 of cooled airflow 84 of cooled air from the cooling duct 82 to the rotor disk 108 and first stage turbine blades 102. More specifically, frame 106 includes a nozzle 103 configured to turn the flow of flow 84 of cooled air from cooling duct 82 to at least partially match a rotation of the rotor disk 108 and rotor disk 108 includes a rotating seal 105 rotatable therewith. The air from nozzle 103 is then provided through an opening 107 defined in a rotating seal to an inlet 109 to an internal cooling duct 111 defined within the rotor disk 108 (depicted in phantom). Flow 84 of cooled air may then be provided through the rotor disk 108 to the first stage turbine blades 102.

In this example, at least a portion of the flow 84 of cooled air flows through a seal formed between the frame 106 and rotating seal and is subsequently delivered to the forward wheelspace cavity 104.

Combustion section 28 also defines a forward shaft outer cavity 110. Forward shaft outer cavity 110 is disposed generally inward along radial direction R from cooling duct 82. Forward shaft outer cavity 110 is fluidly connected to HP turbine 30 via forward wheelspace cavity 104.

Here, propulsion system 10 with outer duct 86 surrounding cooling duct 82 presents an insulated delivery circuit for flow 84 of cooled air that reduces an amount of thermal pollution caused by the high levels of thermal energy present in combustion section 28. The reduction in thermal pollution to flow 84 of cooled air enables a reduction in a flow rate of flow 84 of cooled air needed for cooling and thereby enabling a reduced size of the source of flow 84 of cooled air (e.g., a cooled cooling air heat exchanger, another heat exchanger, or another thermal management device).

Additionally, in at least certain exemplary aspects, flow 94 of buffer air can also be utilized by HP compressor 26 via aft cavity 72. Flow 94 of buffer air can be used to reduce a temperature of the air inside aft cavity 72 resulting in cooler air being delivered to HP compressor 26 for cooling purposes. As a result of this cooler cooling air being delivered to HP compressor 26 by way of aft cavity 72, in certain exemplary embodiments, a dedicated stream of cooling air from a heat exchanger (that otherwise would have been needed) may be eliminated due to cooling benefits gained by the utilization of flow 94 of buffer air as cooling air for HP compressor 26. In this way, propulsion system 10 with cooling duct 82 and outer duct 86 enables improved rotor temperatures of HP compressor 26 as well as of HP turbine 30.

Figure 3:
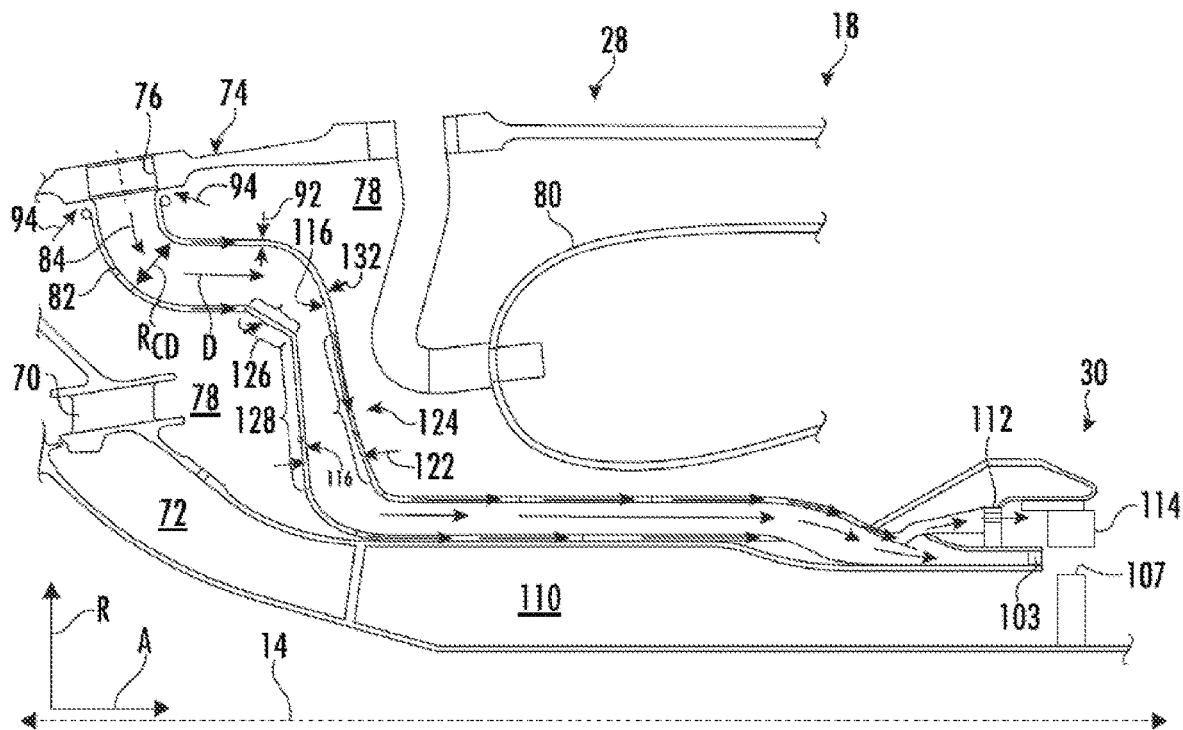
FIG. 3 is a cross-sectional view of a compressor section and a combustion section of the exemplary gas turbine that shows a cooling tube assembly in accordance with another exemplary aspect of the present disclosure.

Referring now to FIG. 3, FIG. 3 is a cross-sectional view of a portion of turbomachine 18 and shows HP compressor 26, combustion section 28, HP turbine 30, and a cooling duct assembly in accordance with another exemplary embodiment of the present disclosure.

The embodiment provided in FIG. 3 is configured substantially similarly as described in regard to FIG. 2. As such, FIG. 3 includes the same or similar components as described above with respect to FIG. 2, with the exclusion of supply line 98, IGV 100, first stage blade 102, forward wheelspace cavity 104, and the addition of components as described in the following description. Accordingly, the same or similar descriptions provided for the components in FIG. 2 also apply to the corresponding components shown in FIG. 3.

Outer duct 86, for the embodiment shown, is fluidly connected to a forward outer seal 112 and to a rotating seal 114. In this example, forward outer seal 112 is disposed downstream (e.g., from left-to-right as shown in FIG. 3) from cooling duct 82 and rotating seal 114 is disposed downstream from forward outer seal 112.

In certain exemplary embodiments, forward outer seal 112 may be positioned adjacent rotor disk 108 and/or first stage blade 102 (see e.g., FIG. 2). For example, forward outer seal 112 and rotating seal 114 may be positioned forward (to the left as shown in FIG. 3) of rotor disk 108 along longitudinal centerline 14 relative to a direction of a flow (to the right in FIG. 3) of combustion gases through propulsion system 10. In this example, flow 84 of cooling air may flow through nozzle 103 to opening 107 defined in the rotating seal 114 to the rotor disk 108, as explained more fully above with respect to FIG. 2. By contrast flow 94 of buffer air may flow through forward outer seal 112 and leak through rotating seal 114 to forward seal cavity 104 (see FIG. 2).

Additionally, in this example, a portion of cooling duct 82 forms an inner venturi tube 116 and a portion of outer duct 86 forms an outer venturi tube 124. As shown in FIG. 3, outer venturi tube 124 surrounds inner venturi tube 116.

More specifically, in at least certain exemplary aspects, inner venturi tube 116 of cooling duct 82 includes inner narrowing portion 118 and inner enlarging portion 120. Inner narrowing portion 118 includes a portion of cooling duct 82 where an inner diameter 122 of cooling duct 82 decreases along a downstream direction D of flow 84 of cooling air flowing through cooling duct 82. Inner enlarging portion 120 includes a portion of cooling duct 82 where inner diameter 122 of cooling duct 82 increases along downstream direction D of the flow 84 of cooling air flowing through cooling duct 82.

Additionally, outer duct 86 includes outer narrowing portion 126 and outer enlarging portion 128. Outer narrowing portion 126 includes a portion of outer duct 86 where an inner diameter 130 of outer duct 86 decreases along downstream direction D of flow 84 of cooling air flowing through cooling duct 82. Outer enlarging portion 128 includes a portion of outer duct 86 where inner diameter 130 of outer duct 86 increases along downstream direction D of flow 84 of cooling air flowing through cooling duct 82. With respect to inner venturi tube 116, inner diameter 122 of cooling duct 82 is at a minimum at an interface between inner narrowing portion 118 and inner enlarging portion 120. Likewise, inner diameter 130 of outer duct 86 is at a minimum at an interface between outer narrowing portion 126 and outer enlarging portion 128.

During operation, flow 84 of cooling air is constricted at a location where a diameter of cooling duct 82 is at a minimum (e.g., at the interface between inner narrowing portion 118 and inner enlarging portion 120). Put another way, flow 84 of cooling air is constricted at a point along cooling duct 82 where cooling duct 82 forms inner venturi tube 116.

Here, the configurations of inner venturi tube 116 and outer venturi tube 124 provide a smaller exterior surface area of outer duct 86 than a tube assembly without the venturi configuration. This smaller exterior surface area of outer duct 86 enables a reduced impact on the aerodynamic behavior of the air flowing within combustion section 28.

Figure 4:
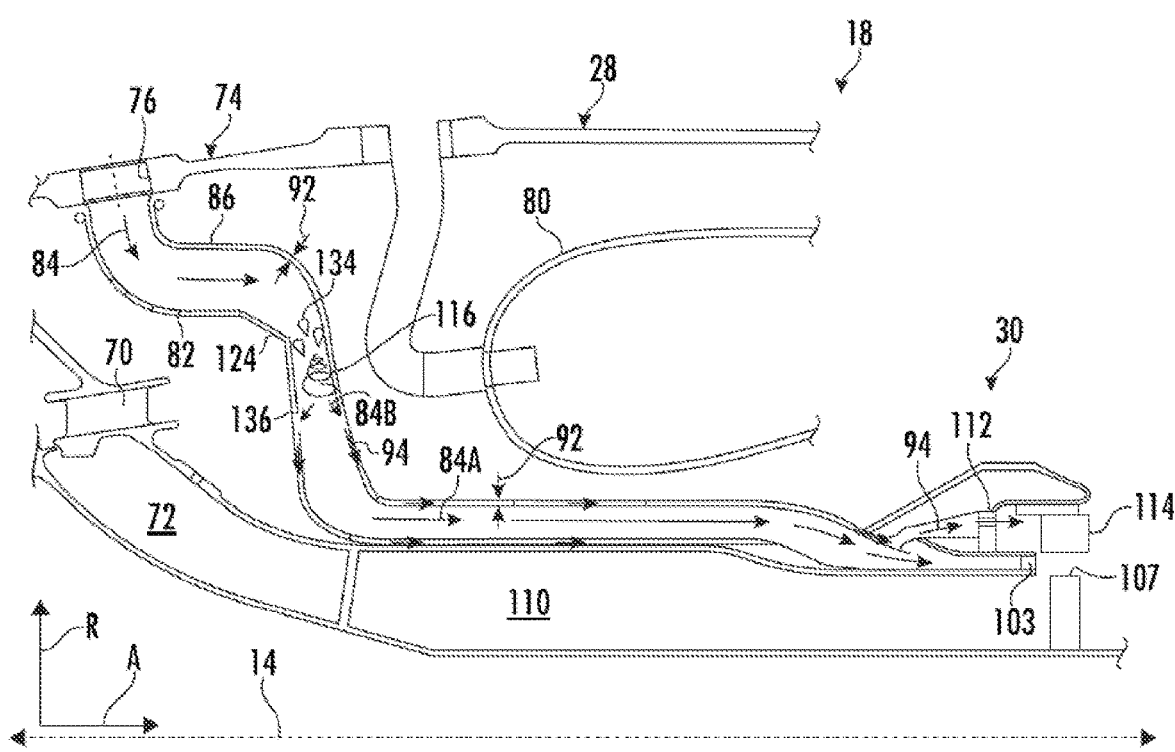
FIG. 4 is a cross-sectional view of a compressor section and a combustion section of the exemplary gas turbine that shows a cooling tube assembly in accordance with yet another exemplary aspect of the present disclosure.

Referring now to FIG. 4, FIG. 4 is a cross-sectional view of a portion of turbomachine 18 and shows HP compressor 26, combustion section 28, HP turbine 30, and a cooling duct assembly in accordance with another exemplary embodiment of the present disclosure.

The exemplary the cooling duct assembly includes a cooling duct 82 configured in substantially the same manner as the cooling duct 82 of FIG. 3. However, as depicted in FIG. 4, cooling duct 82 further includes swirl vanes 134 and defines a slot 136. Swirl vanes 134 are airfoils configured for imparting swirl into flow 84 of cooled air passing across swirl vanes 134. As shown in FIG. 4, swirl vanes 134 are disposed on an inner surface of cooling duct 82 along a radial direction $R_{CD}$ of cooling duct 82.

In one example, swirl vanes 134 can be configured as a cyclonic separator or centrifugal separator. For example, with such a configuration, swirl vanes 134 are configured to impart rotation and centrifugal force into flow 84 of cooled air. As flow 84 of cooled air passes across swirl vanes 134, flow 84 of cooled air becomes separated into primarily two flow streams, those of an inner flow 84A of cooled air and outer flow 84B of cooled air. For example, as flow 84 of cooled air is swirled by swirl vanes 134, a heavier portion of flow 84 of cooled air (i.e., outer flow 84B of cooled air) is spun outwards along a radially direction of cooling duct 82. Flow 84B of cooled air may include higher density air, a higher amount of particulates than flow 84A of cooled air, or both.

In this example, swirl vanes 134 are disposed in inner venturi tube 116. It will be appreciated, however, that in other exemplary embodiments, swirl vanes 134 may be disposed or located upstream or downstream along downstream direction D of flow 84 of cooled air from inner venturi tube 116, or may be positioned in the cooling duct assembly without an inner venturi tube 116 or outer venturi tube 124.

In one example, slot 136 can be a single, full ring opening extending an entire 360° of cooling duct 82. In other examples, slot 136 can include one or more openings, perforations, slits, slots, or holes disposed around a circumference of cooling duct 82. Slot 136 is, for the embodiment shown, disposed downstream along downstream direction D of flow 84 of cooled air from swirl vanes 134. In this way, as outer flow 84B of cooled air is flung outward in a radial direction of cooling duct 82, a portion of outer flow 84B of cooled air exits cooling duct 82 through slot 136 and enters into gap 92 between cooling duct 82 and outer duct 86. Outer flow 84B of cooled air continues through the gap 92 as the buffer air 94.

Here, with swirl vanes 134 positioned inside of cooling duct 82, particle laden (e.g., dirty) flow 84B of cooled air is ejected from cooling duct 82 into outer duct 86 leaving flow 84A of cooled air as a cleaned flow of cooled air flowing from cooling duct 82 to a downstream component such as first stage blade 102 and rotor disk 108. Such a configuration may therefore minimize a risk of particles flowing into internal cooling passages of rotor disk 108 and first stage blades 102, potentially blocking or clogging such internal cooling passages.

In certain exemplary embodiments, the dirty or particle-laden flow 84B of cooled air can be delivered to forward outer seal 112 and through rotating seal 114 for forward cavity 104.

Figure 5:
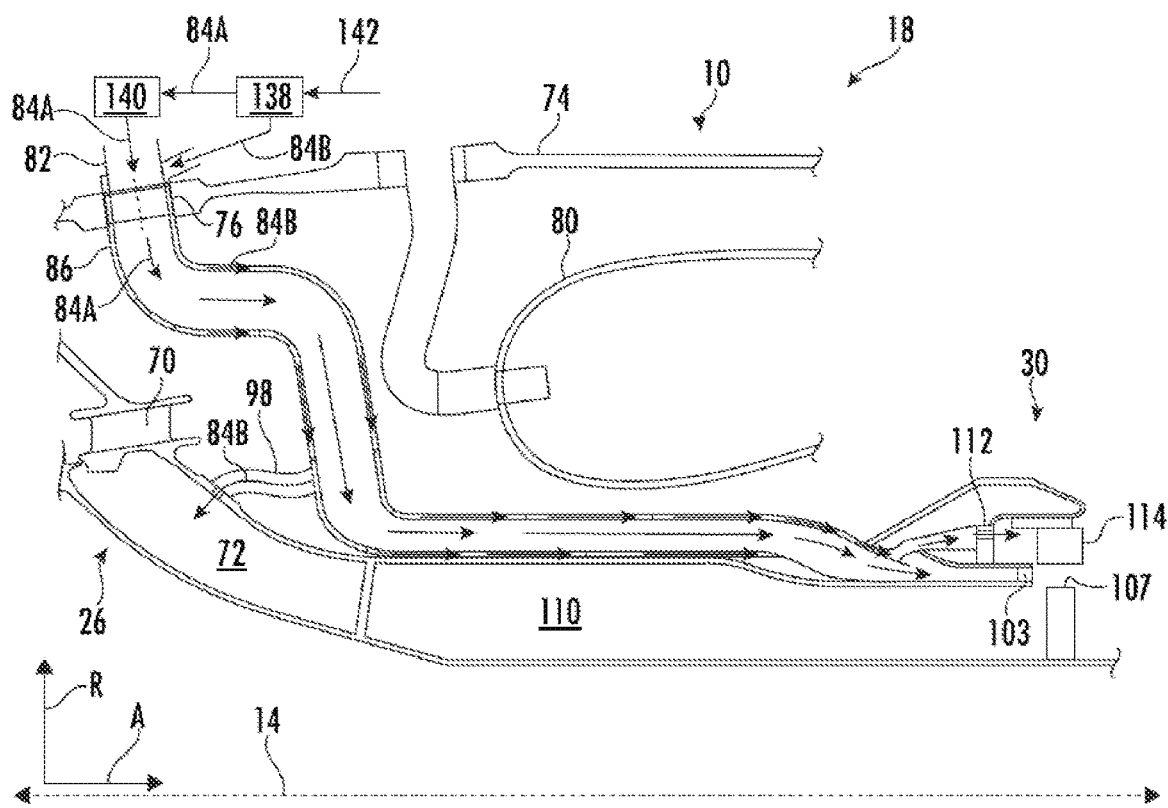
FIG. 5 is a cross-sectional view of a compressor section and a combustion section of the exemplary gas turbine that shows a cooling tube assembly in accordance with still another exemplary aspect of the present disclosure.

Referring now to FIG. 5, FIG. 5 is a cross-sectional view of a portion of turbomachine 18 and shows HP compressor 26, combustion section 28, HP turbine 30, and the cooling duct assembly in accordance with another exemplary embodiment of the present disclosure. Here, turbomachine 18 and the cooling duct assembly is configured in substantially the same manner as turbomachine 18 and the cooling duct assembly of FIG. 2. However, for the embodiment of FIG. 5, turbomachine 18 and the cooling duct assembly further includes a separator 138 and a heat exchanger 140. Separator 138 is a component for separating a single flow of air into two or more flows of air. In certain exemplary embodiments, separator 138 can be a cyclonic separator, a centrifugal separator, a particle separator, or another type of separator. In this example, separator 138 is disposed externally from combustor casing 74 and is fluidly connected to and between the compressor section and heat exchanger 140. During operation, separator 138 receives a flow 142 of air from the compressor section, such as the HP compressor 26, and separates the flow of air from compressor section into a clean flow 84A of air and a dirty flow 84B of air. Separator then delivers clean flow 84A of air to heat exchanger 140 and delivers dirty flow 84B of air to outer duct 86 and into gap 92 as flow 94 of buffer air. Ends of both cooling duct 82 and outer duct 86, in the embodiment shown, extend through fluid inlet 76 defined by combustor casing 74.

In certain exemplary embodiments, heat exchanger 140 can include a cooled cooling air heat exchanger. Here, heat exchanger 140 is fluidly connected to and between separator 138 and cooling duct 82. During operation, heat exchanger 140 removes thermal energy from clean flow 84A of air and delivers the cooled clean flow 84A of air to cooling duct 82. Heat exchanger 140 may be in thermal communication with any suitable cooling fluid source. For example, heat exchanger 140 may be configured to receive a thermal fluid from a thermal bus, a bypass air from a bypass passage, fuel from a fuel source, etc.

As shown in FIG. 5, dirty flow 84B of air acts as the buffer air utilized by outer duct 86 to insulate cooling duct 82 from thermal energy pollution within diffuser cavity 78. After being drawn through gap 92, dirty flow 84B of air can be eventually delivered to aft cavity 72 of HP compressor 26 or to forward outer seal 112. For example, in certain exemplary embodiments, a portion of dirty flow 84B of air can be diverted from gap 92 to supply line 98 and can be delivered to aft cavity 72 of HP compressor 26.

Figure 6:
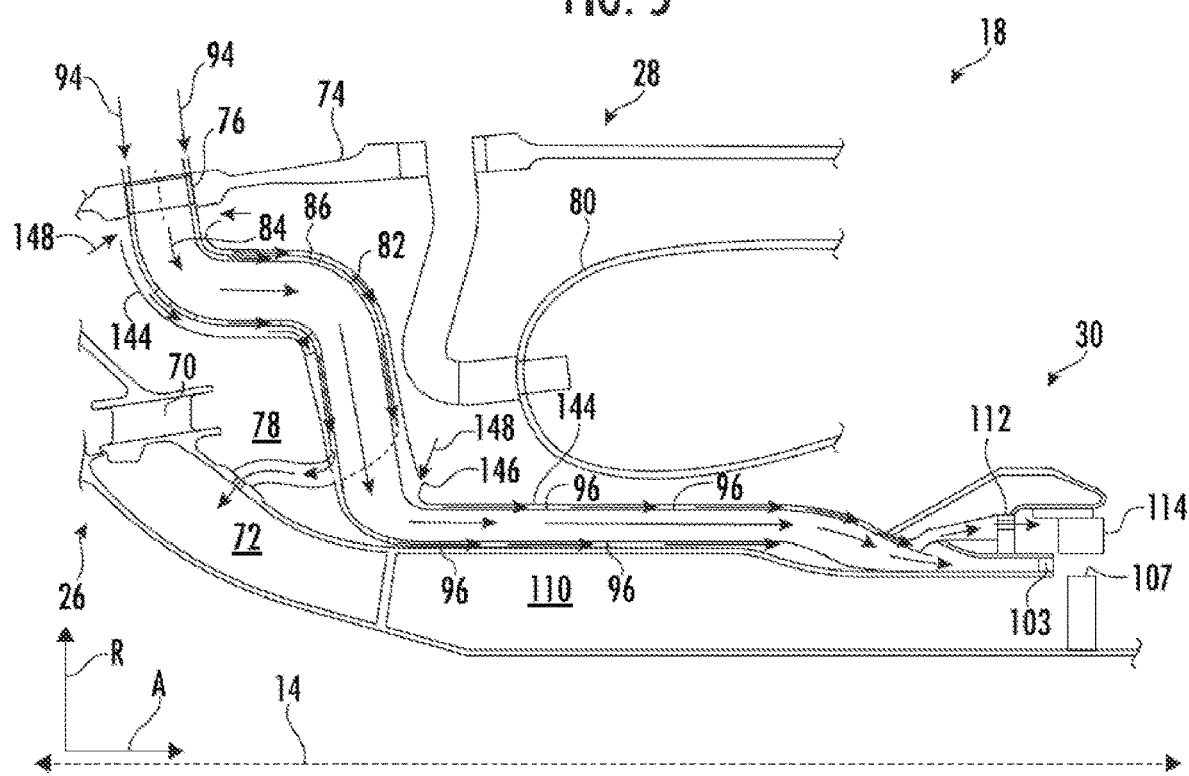
FIG. 6 is a cross-sectional view of a compressor section and a combustion section of the exemplary gas turbine that shows a cooling tube assembly in accordance with yet another exemplary aspect of the present disclosure.

Referring now to FIG. 6, FIG. 6 is a cross-sectional view of a portion of turbomachine 18 and shows HP compressor 26, combustion section 28, HP turbine 30, and a cooling duct assembly in accordance with another exemplary embodiment of the present disclosure. Here, turbomachine 18 and the cooling duct assembly is configured in substantially the same manner as turbomachine 18 and the cooling duct assembly of, e.g., FIGS. 2 and 3. However, for the embodiment of FIG. 6, turbomachine 18 and the cooling duct assembly further include an additional third tube 144 with one or more openings 146 and a third flow 148 of air.

In this example, third tube 144 is disposed outside of and around outer duct 86 such that cooling duct 82 and outer duct 86 are nested within third tube 144. Here, third tube 144 is configured to receive a source of air (e.g., third flow 148 of air) from within diffuser cavity 78 through one or more openings 146. For the embodiment depicted, third tube 144 defines a first opening 146A proximate fluid inlet 76 (e.g., closer to fluid inlet 76 than diffuser nozzle 70) and through a second opening 146B located inward of diffuser nozzle 70 along radial direction R of gas turbine engine 10. First and second openings 146A, 146B are each configured as an opening or slot disposed in third tube 144 or defined by third tube 144 that enables third flow 148 of air to enter into third tube 144.

Here, multiple openings 146 of third tube 144 are disposed at different locations along third tube 144 so as to allow for intake of third flow 148 of air at different locations within diffuser cavity 78. These multiple intake locations allow third tube 144 to receive third flow 148 of air with different amounts of thermal energy to enhance the buffering of flow 84 of cooled air with multiple layers of buffer air shielding flow 84 of cooled air from thermal pollution within diffuser cavity 78.

Figure 7:
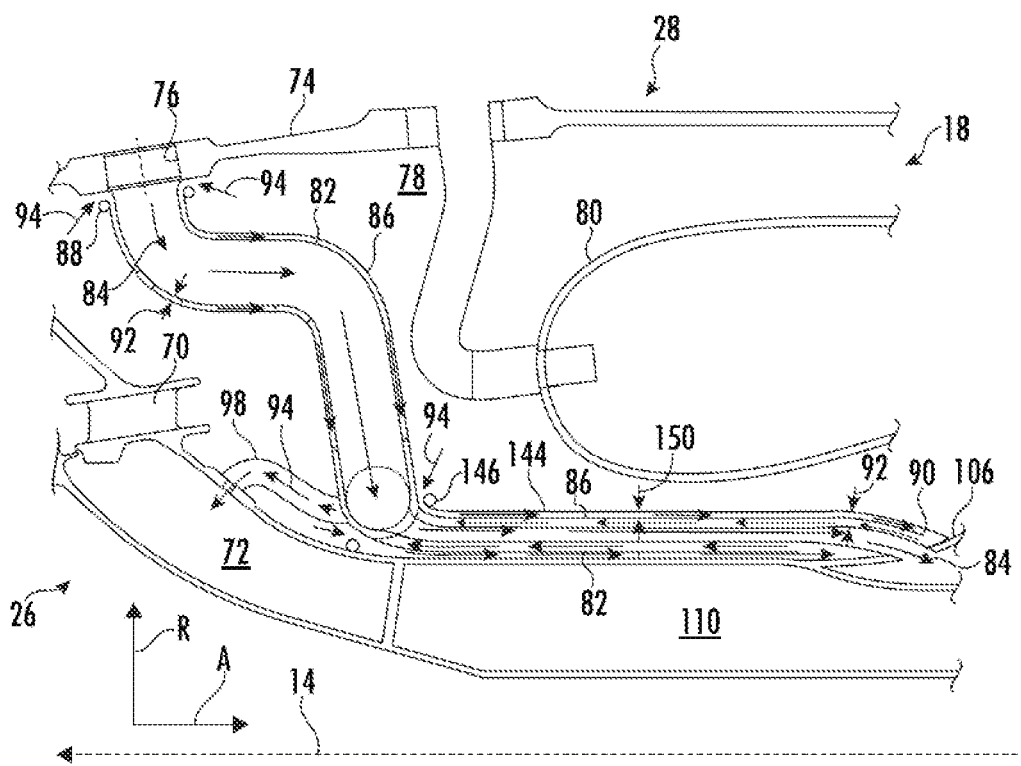
FIG. 7 is a cross-sectional view of a compressor section and a combustion section of the exemplary gas turbine that shows a cooling tube assembly in accordance with still another exemplary aspect of the present disclosure.

Referring now to FIG. 7, FIG. 7 is a cross-sectional view of a portion of turbomachine 18 and shows HP compressor 26, combustion section 28, HP turbine 30, and the cooling tube assembly in accordance with another exemplary embodiment of the present disclosure. Here, turbomachine 18 and the cooling duct assembly is configured in substantially the same manner as turbomachine 18 and the cooling duct assembly of FIG. 6. However, for the embodiment of FIG. 7, the assembly includes a third tube 144 (with an opening 146) and a second gap 150 in a different configuration.

In this example, cooling duct 82 extends from combustor casing 74 at fluid inlet 76 to a portion of frame 106 located at second end 90 of outer duct 86.

Third tube 144 is disposed to surround a portion of outer duct 86 as well as a portion of cooling duct 82. In this example, a first end of third tube 144 is located at or near supply line 98 (e.g., defining a separation less than about 5 inches, such as less than about 3 inches, such as less than about 1 inch), with a second end of third tube 144 being disposed and connected to frame 106 at a point where cooling duct 82 connects to and passes through frame 106. In this example, a portion of cooling duct 82 and a portion of outer duct 86 are nested within third tube 144.

Gap 150 is fluidly connected to gap 92 at a location of second end 90 of outer duct 86. In this example a fluidic passage is formed by gap 150, by gap 92, and by supply line 98 that is configured to supply flow 94 of buffer air from two separate portions of diffuser cavity 78 (e.g., from first end 88 of outer duct 86 and from opening 146 of third tube 144) and to aft cavity 72 via gap 92, gap 150, and supply line 98. After flow 94 of buffer air enters into third tube 144 through opening 146, flow 94 of buffer air flows in a first axial direction through gap 150. As flow 94 of buffer air flowing through gap 150 reaches frame 106 at second end 90 of outer duct 86, flow 94 of buffer air turns around second end 90 of outer duct 86 and flows through gap 92 in a second axial direction that is opposite from the first axial direction. In this example, the first axial direction is from forward-to-aft (left-to-right as shown in FIG. 7) and second axial direction is from aft-to-forward (right-to-left as shown in FIG. 7).

In certain exemplary embodiments, opening 146 of third tube 144 can be located at a location where a pressure of the air within diffuser cavity 78 is higher than the air located at or near first end 88 of outer duct 86. This pressure differential between flow 94 of buffer air entering into outer duct 86 at first end 88 of outer duct 86 and flow 95 of buffer air entering into third tube 144 at opening 146 can cause flow 94 of buffer air to flow faster through gap 150 and through gap 92 back towards supply line 98 than a portion of flow 94 of buffer air flowing through gap 92 from first end 88 of outer duct 86 to supply line 98. With the increased speed of flow 94 of buffer air flowing through gap 150, thermal energy from the air within diffuser cavity 78 has less time exposed to flow 94 of buffer air flowing through third tube 144, thereby reducing the amount of thermal energy transferred from diffuser cavity 78 to flow 84 of cooling air within cooling duct 82.

Figure 8:
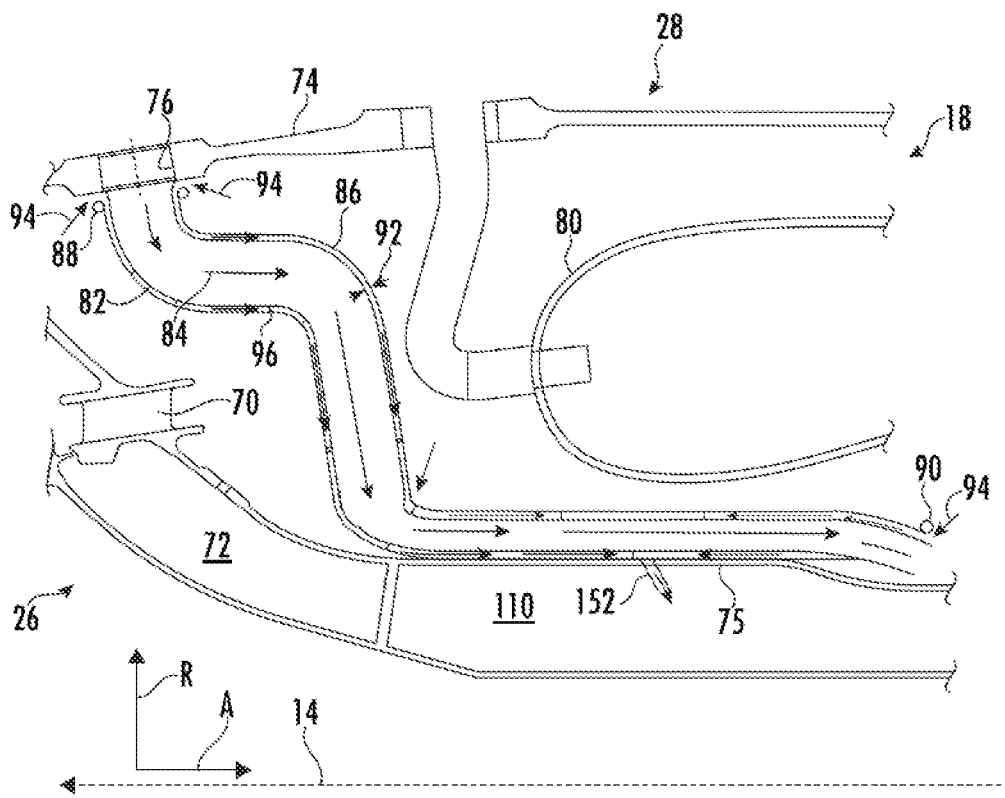
FIG. 8 is a cross-sectional view of a compressor section and a combustion section of the exemplary gas turbine that shows a cooling tube assembly in accordance with yet another exemplary aspect of the present disclosure.

Referring now to FIG. 8, FIG. 8 is a cross-sectional view of a portion of turbomachine 18 and shows HP compressor 26, combustion section 28, HP turbine 30, and a cooling duct assembly in accordance with another exemplary embodiment of the present disclosure. Here, turbomachine 18 and the cooling duct assembly is configured in substantially the same manner as turbomachine 18 and the cooling duct assembly of FIG. 2. However, for the embodiment of FIG. 5, turbomachine 18 and the cooling duct assembly further includes a bypass port 152 extending from outer duct 86 to forward shaft outer cavity 110.

In this example, combustion section 28 further includes an inner combustor casing 75, and bypass port 152 is a fluidic outlet that is in fluid communication with gap 92 between cooling duct 82 and outer duct 86. Bypass port 152 extends from outer duct 86, through a portion of inner combustor casing 75, and into forward shaft outer cavity 110.

In the absence of supply line 98 connecting gap 92 to aft cavity 72, all or most of flow 94 of buffer air exits outer duct 86 via bypass port 152.

In this way, a larger amount of or a higher pressure of flow 94 of buffer air can be supplied to forward shaft outer cavity 110 and to components such as rotating seal 114 (see e.g., FIG. 3) or to components of HP turbine 30 such as forward wheelspace cavity 104 or rotor disk 108 (see e.g., FIG. 2). In one example, an effect of a larger amount of flow 94 of buffer air entering into forward shaft outer cavity 110 is for a greater amount of flow 94 of buffer air flowing to components downstream of forward shaft outer cavity 110 thereby enhancing the transfer of thermal energy and reducing thermal pollution of turbomachine 18.

It will be appreciated that any configuration and/or components of propulsion system 10 shown throughout FIGS. 1 through 8 can be incorporated or combined with any other components of propulsion system 10 shown throughout FIGS. 1 through 8. Likewise, the descriptions of any component presented in a given figure apply and can be used to refer to or describe similarly numbered components shown in other figures.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine includes a combustion section, a turbine section, and a compressor section with a high pressure compressor. The combustion section includes a combustor casing, a combustor, a cooling duct, and an outer duct. The combustor casing defines at least in part a diffuser cavity and a fluid inlet. The combustor disposed is in the diffuser cavity. The cooling duct is in fluid communication with the fluid inlet in the combustor casing and is configured to transport a flow of cooled air. The outer duct surrounds at least a portion of the cooling duct and extends along a portion of an entire length of the cooling duct. The outer duct defines a gap with the cooling duct and is configured to transport a flow of buffer air through the gap. The turbine section is disposed downstream from the combustion section. The cooling duct is in fluid communication with the turbine section.

The gas turbine engine of one or more of these clauses, wherein the gas turbine engine further comprises a cooled cooling air heat exchanger, wherein the cooling duct is fluidly connected to and is configured to receive the flow of cooled air from the cooled cooling air heat exchanger.

The gas turbine engine of one or more of these clauses, further comprising a particle separator disposed externally from the combustor casing, wherein the outer duct is configured to receive the flow of buffer air from the diffuser cavity, the cooling duct, the particle separator, or any combination thereof.

The gas turbine engine of one or more of these clauses, wherein the cooling duct comprises a swirl vane disposed on an inner surface of the cooling duct along a radial direction of the cooling duct, wherein the swirl vane is configured to impart swirl into a flow of cooled air that passes across the swirl vane.

The gas turbine engine of one or more of these clauses, wherein the flow of buffer air received by the outer duct from the cooling duct comprises a first flow of bleed air drawn from the cooling duct that was swirled outward along the radial direction of the cooling duct by the swirl vane.

The gas turbine engine of one or more of these clauses, wherein the turbine section comprises a high pressure turbine having a first stage of high pressure turbine rotor blades, and wherein the cooling duct is in fluid communication with the first stage of high pressure turbine rotor blades of the high pressure turbine.

The gas turbine engine of one or more of these clauses, wherein the outer duct is configured to deliver a portion of the flow of buffer air to an aft cavity of the high pressure compressor, a forward outer seal disposed downstream from the cooling duct, a first stage blade of the turbine section, a forward shaft outer cavity of the turbine section, a forward wheelspace cavity, or any combination thereof.

The gas turbine engine of one or more of these clauses, wherein the outer duct is a first outer duct, wherein the first outer duct defines a first gap between the cooling duct and the outer duct, wherein the combustion section further comprises a second outer duct disposed around the first outer duct, wherein the first outer duct is nested inside of the second outer duct, wherein the second outer duct defines a second gap between the first outer duct and the second outer duct.

The gas turbine engine of one or more of these clauses, further comprising a plurality of standoffs connected to and extending between the cooling duct and the outer duct.

The gas turbine engine of one or more of these clauses, wherein the cooling duct comprises an inner narrowing portion and an inner enlarging portion, wherein the inner narrowing portion includes a portion of the cooling duct where an inner diameter of the cooling duct decreases along a downstream direction of a flow of cooling air flowing through the cooling duct, wherein the inner enlarging portion includes a portion of the cooling duct where the inner diameter of the cooling duct increases along a downstream direction of the flow of cooling air flowing through the cooling duct, wherein the outer duct comprises an outer narrowing portion and an outer enlarging portion, wherein the outer narrowing portion includes a portion of the outer duct where an inner diameter of the outer duct decreases along a downstream direction of the flow of cooling air flowing through the cooling duct, wherein the outer enlarging portion includes a portion of the outer duct where the inner diameter of the outer duct increases along a downstream direction of the flow of cooling air flowing through the cooling duct.

The gas turbine engine of one or more of these clauses, wherein a portion of the cooling duct forms an inner venturi tube, wherein a portion of the outer duct forms an outer venturi tube, wherein the outer venturi tube surrounds the inner venturi tube.

A method of managing thermal energy in a gas turbine engine includes providing a flow of cooled air to a cooling duct positioned in a diffuser cavity defined by a combustor casing of the gas turbine engine. A flow of buffer air can be provided into a gap defined between the cooling duct and an outer duct surrounding the cooling duct to insulate the flow of cooled air provided to the cooling duct. The cooling duct is nested in the outer duct. The flow of cooling air can be delivered to a turbine section of the gas turbine engine.

The method of one or more of these clauses, further comprising: swirling, with a swirl vane, a portion of the flow of cooled air flowing through the cooling duct, wherein providing the flow of buffer air into the gap comprises providing a portion of the swirled flow of cooled air into the gap between the cooling duct and the outer duct.

The method of one or more of these clauses, further comprising diverting a portion of the flow of buffer air to an aft cavity of a high pressure compressor of the gas turbine engine.

The method of one or more of these clauses, further comprising decreasing, with the portion of the flow of buffer air, a thermal energy of the aft cavity of the high pressure compressor of the gas turbine engine.

The method of one or more of these clauses, further comprising delivering the flow of buffer air to an aft cavity of a high pressure compressor, a forward outer seal disposed downstream from the cooling duct, a first stage blade of a turbine section, a forward shaft outer cavity of the turbine section, a forward wheelspace cavity, a forward shaft outer cavity of a high pressure turbine of the gas turbine engine, or any combination thereof.

The method of one or more of these clauses, further comprising constricting the flow of cooled air through the cooling duct at a location where a diameter of the cooling duct is at a minimum.

The method of one or more of these clauses, further comprising constricting the flow of cooled air through the cooling duct at a point along the cooling duct where the cooling duct forms a venturi tube.

The method of one or more of these clauses, wherein delivering the flow of cooling air to a turbine section of the gas turbine engine comprises delivering the flow of cooling air to a first stage of high pressure turbine rotor blades of a high pressure turbine of the turbine section.

A cooling duct assembly for a gas turbine engine includes a cooling duct and an outer duct. The gas turbine engine includes a turbine section and combustor casing, the combustor casing defining at least in part a diffuser cavity and a fluid inlet. The cooling duct is configured to be in fluid communication with the fluid inlet in the combustor casing and in fluid communication with the turbine section when installed in the gas turbine engine. The cooling duct is configured to transport a flow of cooled air. The outer duct surrounds at least a portion of the cooling duct and extends along a portion of an entire length of the cooling duct. The outer duct defines a gap with the cooling duct is configured to transport a flow of buffer air through the gap.

We claim:

1. A gas turbine engine comprising:
   a compressor section comprising a high pressure compressor;
   a combustion section comprising: a combustor casing defining at least in part a diffuser cavity and a fluid inlet;
   a combustor disposed in the diffuser cavity;
   a cooling duct in fluid communication with the fluid inlet in the combustor casing, wherein the cooling duct is configured to transport a flow of cooled air; and
   an outer duct surrounding at least a portion of the cooling duct and extending along a portion of an entire length of the cooling duct, wherein the outer duct defines a gap with the cooling duct, and wherein the outer duct is configured to transport a flow of buffer air through the gap; and
   a turbine section disposed downstream from the combustion section, wherein the cooling duct is in fluid communication with the turbine section,
   wherein the cooling duct comprises a swirl vane disposed on an inner surface of the cooling duct along a radial direction of the cooling duct, wherein the swirl vane is configured to impart swirl into a flow of cooled air that passes across the swirl vane;
   wherein the cooling duct includes an opening downstream of the swirl vane and in fluid communication with the gap and
   wherein the flow of buffer air received by the outer duct from the cooling duct comprises a first flow of bleed air drawn from the cooling duct that was swirled outward along the radial direction of the cooling duct by the swirl vane and entered into the opening.

2. The gas turbine engine of claim 1, wherein the gas turbine engine further comprises a cooled cooling air heat exchanger, wherein the cooling duct is fluidly connected to and is configured to receive the flow of cooled air from the cooled cooling air heat exchanger.

3. The gas turbine engine of claim 1, further comprising a particle separator disposed externally from the combustor casing, wherein the outer duct is configured to receive the flow of buffer air from the diffuser cavity, the cooling duct, the particle separator, or any combination thereof.

4. The gas turbine engine of claim 1, wherein the turbine section comprises a high pressure turbine having a first stage of high pressure turbine rotor blades, and wherein the cooling duct is in fluid communication with the first stage of high pressure turbine rotor blades of the high pressure turbine.

5. The gas turbine engine of claim 1, wherein the outer duct is configured to deliver a portion of the flow of buffer air to an aft cavity of the high pressure compressor, a forward outer seal disposed downstream from the cooling duct, a first stage blade of the turbine section, a forward shaft outer cavity of the turbine section, a forward wheelspace cavity, or any combination thereof.

6. The gas turbine engine of claim 1, wherein the outer duct is a first outer duct, wherein the first outer duct defines a first gap between the cooling duct and the outer duct, wherein the combustion section further comprises a second outer duct disposed around the first outer duct, wherein the first outer duct is nested inside of the second outer duct, wherein the second outer duct defines a second gap between the first outer duct and the second outer duct.

7. The gas turbine engine of claim 1, further comprising a plurality of standoffs connected to and extending between the cooling duct and the outer duct.

8. The gas turbine engine of claim 1, wherein the cooling duct comprises an inner narrowing portion and an inner enlarging portion, wherein the inner narrowing portion includes a portion of the cooling duct where an inner diameter of the cooling duct decreases along a downstream direction of a flow of cooling air flowing through the cooling duct, wherein the inner enlarging portion includes a portion of the cooling duct where the inner diameter of the cooling duct increases along a downstream direction of the flow of cooling air flowing through the cooling duct, wherein the outer duct comprises an outer narrowing portion and an outer enlarging portion, wherein the outer narrowing portion includes a portion of the outer duct where an inner diameter of the outer duct decreases along a downstream direction of the flow of cooling air flowing through the cooling duct, wherein the outer enlarging portion includes a portion of the outer duct where the inner diameter of the outer duct increases along a downstream direction of the flow of cooling air flowing through the cooling duct.

9. The gas turbine engine of claim 1, wherein a portion of the cooling duct forms an inner venturi tube, wherein a portion of the outer duct forms an outer venturi tube, wherein the outer venturi tube surrounds the inner venturi tube.

10. A method of managing thermal energy in a gas turbine engine, the method comprising: providing a flow of cooled air to a cooling duct positioned in a diffuser cavity defined by a combustor casing of the gas turbine engine;
   providing a flow of buffer air into a gap defined between the cooling duct and an outer duct surrounding the cooling duct to insulate the flow of cooled air provided to the cooling duct, wherein the cooling duct is nested in the outer duct;
   swirling, with a swirl vane, a portion of the flow of cooled air flowing through the cooling duct, wherein providing the flow of buffer air into the gap comprises providing a portion of the swirled flow of cooled air into the gap between the cooling duct and the outer duct via an opening in the cooling duct downstream of the swirl vane, said opening in fluid communication with the gap; and delivering the flow of cooling air to a turbine section of the gas turbine engine.

11. The method of claim 10, further comprising diverting a portion of the flow of buffer air to an aft cavity of a high pressure compressor of the gas turbine engine.

12. The method of claim 11, further comprising decreasing, with the portion of the flow of buffer air, a thermal energy of the aft cavity of the high pressure compressor of the gas turbine engine.

13. The method of claim 10, further comprising delivering the flow of buffer air to an aft cavity of a high pressure compressor, a forward outer seal disposed downstream from the cooling duct, a first stage blade of a turbine section, a forward shaft outer cavity of the turbine section, a forward wheelspace cavity, a forward shaft outer cavity of a high pressure turbine of the gas turbine engine, or any combination thereof.

14. The method of claim 10, further comprising constricting the flow of cooled air through the cooling duct at a location where a diameter of the cooling duct is at a minimum.

15. The method of claim 10, further comprising constricting the flow of cooled air through the cooling duct at a point along the cooling duct where the cooling duct forms a venturi tube.

16. The method of claim 10, wherein delivering the flow of cooling air to a turbine section of the gas turbine engine comprises delivering the flow of cooling air to a first stage of high pressure turbine rotor blades of a high pressure turbine of the turbine section.

* * * * *